United States Patent
Vig et al.

(10) Patent No.: US 10,592,611 B2
(45) Date of Patent: Mar. 17, 2020

(54) SYSTEM FOR AUTOMATIC EXTRACTION OF STRUCTURE FROM SPOKEN CONVERSATION USING LEXICAL AND ACOUSTIC FEATURES

(71) Applicant: Palo Alto Research Center Incorporated, Palo Alto, CA (US)

(72) Inventors: Jesse Vig, Los Altos, CA (US); Harish Arsikere, Bangalore (IN); Margaret H. Szymanski, Santa Clara, CA (US); Luke R. Plurkowski, Redwood City, CA (US); Kyle D. Dent, San Carlos, CA (US); Daniel G. Bobrow, Palo Alto, CA (US); Daniel Davies, Palo Alto, CA (US); Eric Saund, San Carlos, CA (US)

(73) Assignee: Conduent Business Services, LLC, Richardson, TX (US)

( * ) Notice: Subject to any disclaimer, the term of this patent is extended or adjusted under 35 U.S.C. 154(b) by 88 days.

(21) Appl. No.: 15/332,766

(22) Filed: Oct. 24, 2016

(65) Prior Publication Data
US 2018/0113854 A1    Apr. 26, 2018

(51) Int. Cl.
| | | |
|---|---|---|
| G10L 15/00 | (2013.01) | |
| G06F 17/27 | (2006.01) | |
| G10L 25/48 | (2013.01) | |
| G10L 15/26 | (2006.01) | |
| H04M 3/51 | (2006.01) | |

(52) U.S. Cl.
CPC .......... *G06F 17/279* (2013.01); *G06F 17/277* (2013.01); *G10L 15/26* (2013.01); *G10L 25/48* (2013.01); *H04M 3/51* (2013.01); *H04M 2201/40* (2013.01); *H04M 2203/357* (2013.01)

(58) Field of Classification Search
CPC ....................................................... G10L 15/00
USPC ........... 704/9, 278, 260, 254, 246, 245, 235; 707/776, 739; 379/88.18, 266.1, 265.09
See application file for complete search history.

(56) References Cited

U.S. PATENT DOCUMENTS 7,930,179 B1 * 4/2011 Gorin ...................... G10L 17/12
                                                      704/245
7,933,774 B1 * 4/2011 Begeja .................. G10L 15/063
                                                      704/231

(Continued)

*Primary Examiner* — Michael C Colucci (57) ABSTRACT

Embodiments of the present invention provide a system for automatically extracting conversational structure from a voice record based on lexical and acoustic features. The system also aggregates business-relevant statistics and entities from a collection of spoken conversations. The system may infer a coarse-level conversational structure based on fine-level activities identified from extracted acoustic features. The system improves significantly over previous systems by extracting structure based on lexical and acoustic features. This enables extracting conversational structure on a larger scale and finer level of detail than previous systems, and can feed an analytics and business intelligence platform, e.g. for customer service phone calls. During operation, the system obtains a voice record. The system then extracts a lexical feature using automatic speech recognition (ASR). The system extracts an acoustic feature. The system then determines, via machine learning and based on the extracted lexical and acoustic features, a coarse-level structure of the conversation.

20 Claims, 8 Drawing Sheets

(56) References Cited

U.S. PATENT DOCUMENTS

| | | | | |
|---|---|---|---|---|
| 8,687,776 B1* | 4/2014 | Reynolds | G06Q 30/02 | 379/88.18 |
| 8,750,489 B2* | 6/2014 | Park | G10L 15/04 | 379/266.1 |
| 8,761,373 B1* | 6/2014 | Raghavan | H04M 3/4936 | 379/111 |
| 8,954,329 B2* | 2/2015 | Labsky | G10L 13/08 | 704/260 |
| 9,633,650 B2* | 4/2017 | Achituv | G10L 15/07 | |
| 2002/0091528 A1* | 7/2002 | Daragosh | G10L 15/30 | 704/270.1 |
| 2003/0088421 A1* | 5/2003 | Maes | G10L 15/30 | 704/270.1 |
| 2006/0067506 A1* | 3/2006 | Flockhart | H04M 3/5237 | 379/265.09 |
| 2006/0149558 A1* | 7/2006 | Kahn | G10L 15/063 | 704/278 |
| 2009/0097634 A1* | 4/2009 | Nambiar | H04M 3/5183 | 379/265.09 |
| 2011/0060587 A1* | 3/2011 | Phillips | G10L 15/30 | 704/235 |
| 2014/0222503 A1* | 8/2014 | Vijayaraghavan | G06Q 30/0201 | 705/7.29 |
| 2014/0297282 A1* | 10/2014 | Peters | G10L 15/19 | 704/254 |
| 2015/0127652 A1* | 5/2015 | Romano | G06F 16/367 | 707/739 |
| 2015/0189086 A1* | 7/2015 | Romano | H04M 3/5175 | 379/265.09 |
| 2015/0286747 A1* | 10/2015 | Anastasakos | G06F 16/9017 | 707/776 |
| 2015/0356969 A1* | 12/2015 | Lee | G10L 15/1822 | 704/245 |
| 2016/0104480 A1* | 4/2016 | Sharifi | G10L 15/08 | 704/254 |
| 2016/0330144 A1* | 11/2016 | Dymetman | G06F 16/48 | |
| 2017/0025124 A1* | 1/2017 | Mixter | G10L 15/32 | |
| 2017/0054848 A1* | 2/2017 | Meng | G06Q 30/02 | |
| 2018/0247645 A1* | 8/2018 | Li | G06F 3/167 | |
| 2019/0325869 A1* | 10/2019 | Mitic | G10L 15/08 | |

* cited by examiner

SYSTEM FOR AUTOMATIC EXTRACTION OF STRUCTURE FROM SPOKEN CONVERSATION USING LEXICAL AND ACOUSTIC FEATURES

BACKGROUND

Field

The present disclosure relates to conversational structure. More specifically, this disclosure relates to a method and system for automatically extracting conversational structure from a voice record based on lexical and acoustic features, and for aggregating relevant statistics and entities from a collection of spoken conversations.

Related Art

Many organizations and businesses have a need to aggregate relevant statistics and entities from a collection of spoken conversations. For example, an organization or business may wish to know the total or average time spent performing certain activities (such as coarse-grain conversational activities). An organization or business engaging in customer service phone calls may also wish to understand or analyze various relevant entities, such as reasons for calling (e.g., can't connect to the internet) or solutions to the problems (e.g., enable wi-fi).

Thus, many organizations and businesses desire to extract the structure of a spoken conversation, so as to provide a scaffolding for the extraction of business-relevant features. For example, if the organization desires to know time spent in conversational activities, extracting the structure of conversations or calls would allow it to compute this directly. For the other aforementioned entities, the structure of the call identifies conversational activities where those entities are likely to occur. For example, reason for call would usually occur during a problem articulation conversational activity.

The current process for extracting conversational structure from customer service phone calls is a manual one. Knowledge workers listen to each call and mark the time spans of the designated high-level activities. This is a labor-intensive process that is only performed for a small percentage of calls, and at a coarse level of conversational structure. An automated approach, on the other hand, enables one to extract conversational structure on a much larger scale and at a finer level of detail.

Some previous work has focused on automatic structure determination based on lexical analysis. However, such work cannot make full use of the rich complementary auditory and non-verbal cues that may be stored in a conversation voice record. For example, cues such as speaking pitch, speaking intensity, timing of silence or pauses, overlap of utterances, repetition, or laughter may hold important information about conversational structure that would be absent from such an approach.

SUMMARY

One embodiment of the present invention provides a system and method for automatically extracting conversational structure from a voice record based on lexical and acoustic features. The system also solves the problem of aggregating business-relevant statistics and entities from a collection of spoken conversations. During operation, the system obtains a voice record of a spoken conversation. The system then extracts a lexical feature from the voice record using an automatic speech recognition (ASR) method. The system extracts an acoustic feature from the voice record. The system then determines, via a machine learning method and based on the extracted lexical feature and acoustic feature, a coarse-level conversational structure of the spoken conversation.

In a variation on this embodiment, extracting the lexical feature from the voice record may further comprise generating a textual transcript of the spoken conversation. Extracting the acoustic feature from the voice record may further comprise identifying, based on the extracted acoustic feature and the textual transcript, a fine-level activity corresponding to a portion of the conversation. Determining the coarse-level conversational structure of the spoken conversation may further comprise inferring, based on the identified fine-level activity, a likely coarse-level activity corresponding to the portion of the conversation.

In a variation on this embodiment, the spoken conversation may be a customer service conversation. The likely coarse-level activity may comprise one or more of: opening; detail gathering; equipment identification; security questions; problem articulation; diagnostics; fix deployment; customer satisfaction questions; hold; transfer; pre-closing; and closing.

In a variation on this embodiment, the extracted acoustic feature may include one or more of: speaking pitch; speaking intensity; timing or length of an utterance; timing of silence or pauses; overlap of utterances; repetition of phrases, words, or word fragments; speaking rhythm; speaking rate; speaking intonation; laughter; a Mel-frequency cepstral coefficient (MFCC); and a derived acoustic feature.

In a variation on this embodiment, the system may determine, via the machine learning method and based on the extracted lexical feature and acoustic feature, a fine-level activity structure of the spoken conversation.

In a variation on this embodiment, the system may determine, via the machine learning method and based on the extracted lexical feature and acoustic feature, one or more intermediate-level structures of the spoken conversation.

In a variation on this embodiment, the fine-level activity structure may indicate a fine-level activity including one or more of: an information request; a clarification request; a repetition request; an action request; pointing; a future action request; an alignment request; a continuer; a confirmation; a sequence closer; a correction; information provision; reporting activity status; waiting; reporting a future event; and reciprocity.

In a variation on this embodiment, the machine learning method may comprise a sequence model such as a hidden Markov model or a recurrent neural network. Determining the coarse-level conversational structure may further comprise tracking, by means of the sequence model, a global conversational state within the conversational structure.

In a variation on this embodiment, the system may compute for a user, via a business intelligence platform, an aggregate statistic, comprising a distribution over categories and/or entities, from a plurality of conversations comprising the spoken conversation. The system may extract for the user, via the business intelligence platform, targeted information about the spoken conversation.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

OVERVIEW

Embodiments of the present invention solve the problem of automatically extracting conversational structure from a voice record by combining extracted lexical and acoustic features. The system also solves the problem of aggregating business-relevant statistics and entities from a collection of spoken conversations. The system may infer a coarse-level conversational structure based on fine-level activities identified from extracted acoustic features. The system can improve significantly over previous systems by extracting conversational structure based on a combination of lexical and acoustic features. This enables the extraction of conversational structure on a larger scale and at a finer level of detail than previous systems. The system can also feed a comprehensive analytics and business intelligence platform, for example in the domain of customer service phone calls. During operation, the system obtains a voice record of a spoken conversation. The system then extracts a lexical feature from the voice record using an automatic speech recognition (ASR) method. The system then extracts an acoustic feature from the voice record. The system then determines, via a machine learning method and based on the extracted lexical feature and acoustic feature, a coarse-level conversational structure of the spoken conversation.

Figure 1:
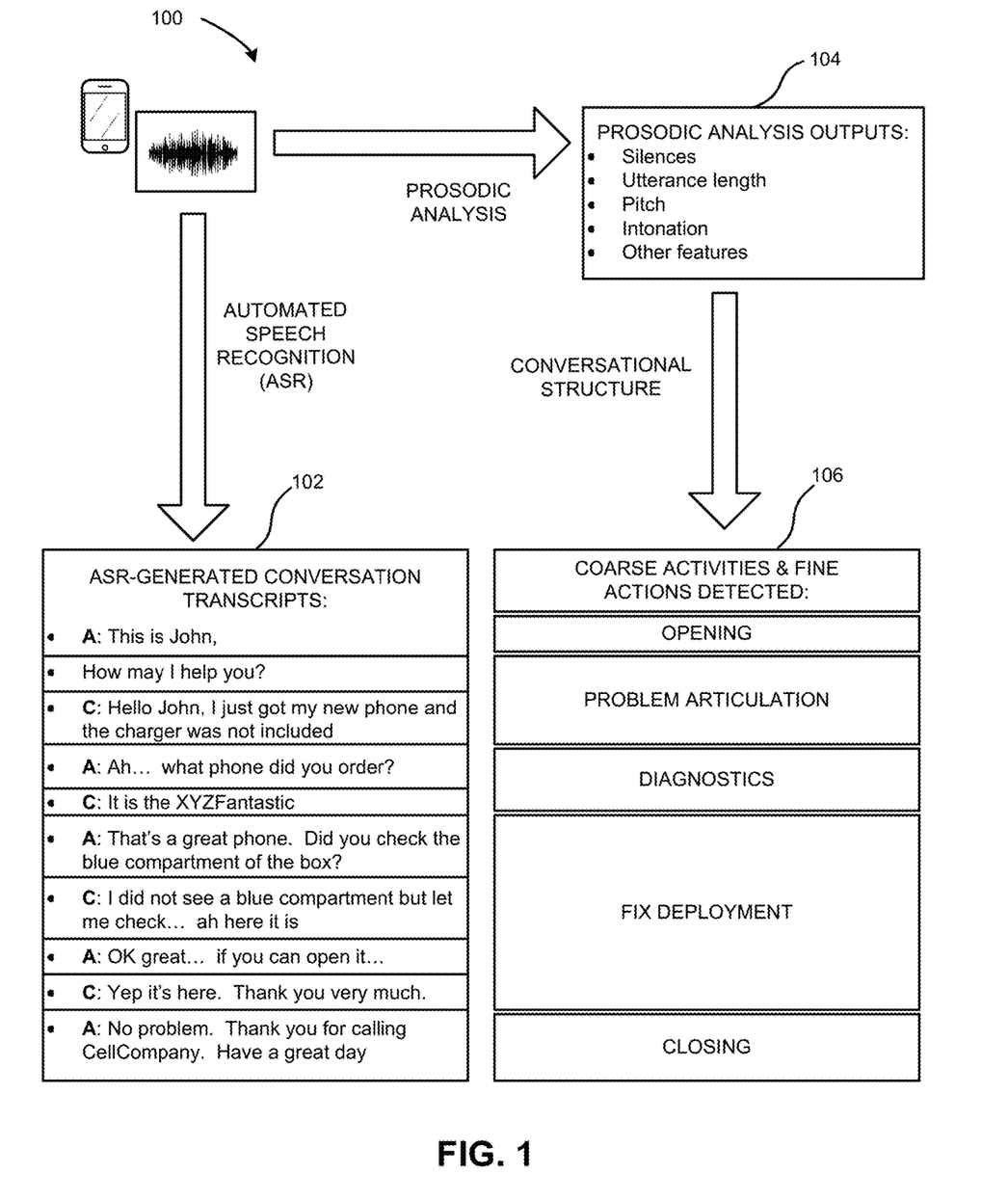
FIG. 1 illustrates a process 100 for extracting conversational structure from an exemplary conversation via prosodic analysis and automatic speech recognition (ASR), according to embodiments of the present invention.

FIG. 1 illustrates a process 100 for extracting conversational structure from an exemplary conversation via prosodic analysis and automatic speech recognition (ASR), according to embodiments of the present invention. In some embodiments, this may include speaker diarization, or classifying portions of the conversation by which conversational participant, or speaker, is speaking. A respective uninterrupted segment of the conversation spoken by a single speaker will be referred to as an utterance or turn. In some embodiments, this diarization may be based on recognition of the speakers' voices. In some embodiments, diarization may be a pre-processing step. In some embodiments, the respective speakers' voices may be recorded on separate channels. As shown, the system may generate a conversation transcript 102 via ASR. The system may also perform prosodic analysis to extract acoustic features 104, such as silence, utterance length, speaking pitch, intonation, and other features, from the conversation.

Based on extracted acoustic features 104 and/or conversation transcript 102, the system may detect coarse activities and fine actions 106 in the conversation. In particular, the system may make use of timing to associate acoustic features 104 with particular features or portions of conversation transcript 102. In this way, the system may make use of acoustic features 104 to help interpret the activities and actions 106 being performed by various portions of transcript 102.

For example, as shown, conversation 102 may be in the domain of a customer service or technical support phone call. Detected coarse activities and fine actions 106 may include call opening, problem articulation, diagnostics, fix deployment, and call closing phases. As shown, the system may partition transcript 102 into such phases 106 based on analyzing extracted acoustic features 104 together with transcript 102.

Figure 2:
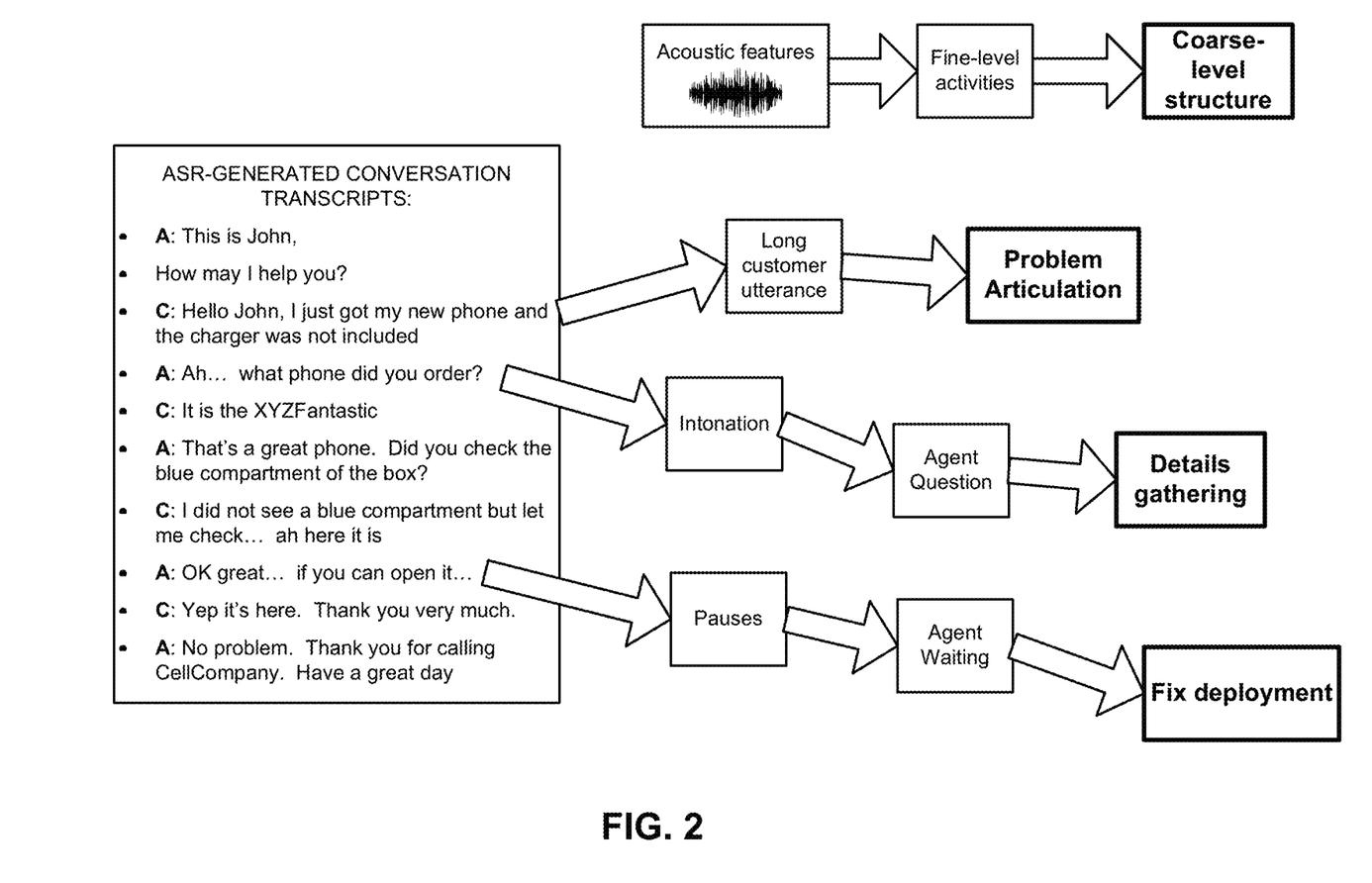
FIG. 2 illustrates inferring a coarse-level conversational structure from fine-level activities and acoustic features, according to embodiments of the present invention.

FIG. 2 illustrates inferring a coarse-level conversational structure from fine-level activities and acoustic features, according to embodiments of the present invention. The conversation shown is the same as conversation 102, in the domain of a customer support phone call. As shown, the system may, based on timing of the acoustic and lexical elements of the conversation, associate identified acoustic features to particular utterances or parts of utterances within the conversation. For example, as shown, features such as intonation, a particularly long utterance, or a pause within an utterance, may be associated with particular utterances or parts of utterances.

The system may use these identified acoustic features as cues to understand or determine what fine-level activities are being performed in the associated utterances or parts of utterances. For example, as shown, a rising intonation at the end of an agent utterance may suggest that the agent is asking a question. Similarly, pauses associated with an agent's utterance may suggest that the agent is waiting. For example, as shown, the agent may wait for the customer to perform some action in response to the agent's request.

Based on identified fine-level and/or intermediate-level activities, either exclusively or in combination with the conversation transcript, the system may infer a coarse-level structure of the conversation. For example, as shown in FIG. 2, waiting for a conversational participant to perform some action may suggest that a coarse activity being performed is fix deployment. By contrast, a question followed by an immediate response, i.e. without a significant pause, may suggest a coarse activity such as detail gathering. As shown, a long utterance from the customer could indicate a coarse activity such as problem articulation. Note that the interpretation of features may also be dependent on the speaker. For example, a long utterance from the agent instead of the customer may indicate fix deployment.

Exemplary coarse- and fine-level activities in the domain of customer service or support phone calls that may be inferred by the system, according to embodiments, are illustrated by Tables 1 and 2.

TABLE 1

Exemplary coarse-level activities in the domain of customer service or support phone calls that may be inferred by the system, according to embodiments.

| Coarse-level activity | Description |
| --- | --- |
| Opening | Occurs at the very beginning of the call. It typically consists of an initial greeting and announcement of the brand and name of agent. |
| Personal Details Gathering | The agent obtains personal information from the customer, for example, name, telephone number, etc. The type of device is not considered personal information. |
| Equipment Identification | The agent obtains information regarding the customer's type of device. The device can be identified either by the make and model and/or IMEI number. |
| Security Questions | Questions for the purpose of establishing the identity of the customer. |
| Problem Articulated By Caller | The customer describes the problem he or she is calling about. It often starts with the agent asking, "how may I help you." As a rule of thumb, it ends when the agent's turn is categorized as "Information Request" as opposed to "Clarification Request" or "Continuer." |
| Diagnostics | Search for fix: The agent tries to better understand the customer problem and identify potential solutions. Typically, it occurs after "Problem articulated by caller" and before "Fix Deployment." |
| Fix Deployment | The agent delivers the solution to the customer. It begins when the agent is ready to suggest a solution never suggested before. It ends when the customer has understood the solution. |
| Customer Satisfaction Questions | Questions to assess customer satisfaction. |
| Hold | The agent puts the customer on hold while consulting with another agent, supervisor or department. The same agent resumes the call. |
| Transfer | The agent suspends the call and a different agent takes over. |
| Pre-Closing | Marks the beginning of the end of the call. It usually starts with the agent summarizing what was achieved in the call. It typically occurs right before "Closing" which marks the end of the call, but not always. There are cases where the pre-closing occurs much earlier: the agent is preparing the customer for the "Closing," however the customer brings up another topic for discussion. |
| Closing | Marks the end of the call. It consists of a few turns where the agent and customer thank each other and say goodbye. |
| Other Activity Coarse | This should be used sparingly, e.g., for cases where the customer and the agent deviate from the purpose of the call (chit chat). |

TABLE 2

Exemplary fine-level activities in the domain of customer service or support phone calls that may be inferred by the system, according to embodiments.

| Fine-level activity | Description |
| --- | --- |
| Information request | Obtaining information, usually in the form of a question. |
| Clarification | Ensuring that speech was understood correctly or |

TABLE 2-continued

Exemplary fine-level activities in the domain of customer service or support phone calls that may be inferred by the system, according to embodiments.

| Fine-level activity | Description |
| --- | --- |
| request | elaborating/explaining previous speech. Usually in the form of a question. |
| Repeat request | A participant had trouble hearing or understanding what was said and requests that it be repeated. |
| Action request | One participant - usually the agent - asks the other participant to perform an action. For example: turn on the phone, hold the volume down, etc. |
| Pointing | A type of action request: it directs the recipient to see or spatially locate something, usually on a device. Often occurs when the agent tries to diagnose the customer's problem, or give a more detailed explanation on how to fix the problem. |
| Future action request | An action request, which must take place in the future, because the customer (or agent) is unable to perform the task during the call. |
| Alignment request | The participant requests permission to proceed with the next task or wants to ensure that the other participant is aware what will happen next. |
| Continuer | Typically produced by one speaker with words such as "yes", "ok", "yep", "hmm" in response to an utterance of the other speaker. |
| Confirmation | The participant repeats the same words that the other participant has said, thus giving the opportunity for correction. |
| Sequence Closer | Marks the end of a sequence. A sequence is a group of turns exchanged for the purpose of accomplishing a single piece of interactional work. |
| Correction | A response to the previous turn, in order to correct a fact or statement previously uttered. |
| Telling - Information provision | Describes (a) turns produced in response to a request for information from the previous turn, and (b) turns where the participant announces, notices, tells, or accounts for something. |
| Report activity status | Usually occurs when the customer communicates to the agent the outcome of an action the agent previously requested the customer to perform. |
| Wait | An action a participant will perform takes time and the other participant waits. The participant may explicitly request the other participant to wait. |
| Future event report | Description of an event or outcome to take place in the future. |
| Reciprocity | A participant's utterance causes the other participant to reciprocate with an utterance of the same action (e.g., greetings, good-byes, thank you). |
| Other Fine Action | This should be used sparingly, e.g., an abandoned turn. |

In some embodiments, inducing or inferring coarse-level structure on the basis of fine-level and/or intermediate-level activities is an important way the system may build confidence in its obtained structure. However, the system's analyses of lexical and acoustic elements may be interdependent. Moreover, in some embodiments, the system may not proceed exclusively inductively, i.e. from fine- to coarse-level information, but rather may also use available cues and information in more complicated ways. For example, if the system makes use of multiple cues to determine a single coarse-level category, in some embodiments, the system may aggregate these multiple cues into a single category determination. In some embodiments, the system may discount an outlying cue that disagrees with other cues, or may demand a measure of consistency among cues. In some embodiments, such a demand for consistency may result in the system proceeding deductively (from coarse to fine levels), for example, by selecting a likely fine-level activity that is consistent with an already-inferred coarse-level activity. In general, in some embodiments, information flow may be possible in either direction between fine- and coarse-level activities, and the determination of coarse-, fine-, and/or intermediate-level structure may be approached as a single interacting problem. However, in general, the presence of multiple levels of structure that are consistent with each other may impart increased confidence to the obtained structure.

System Architecture

Figure 3:
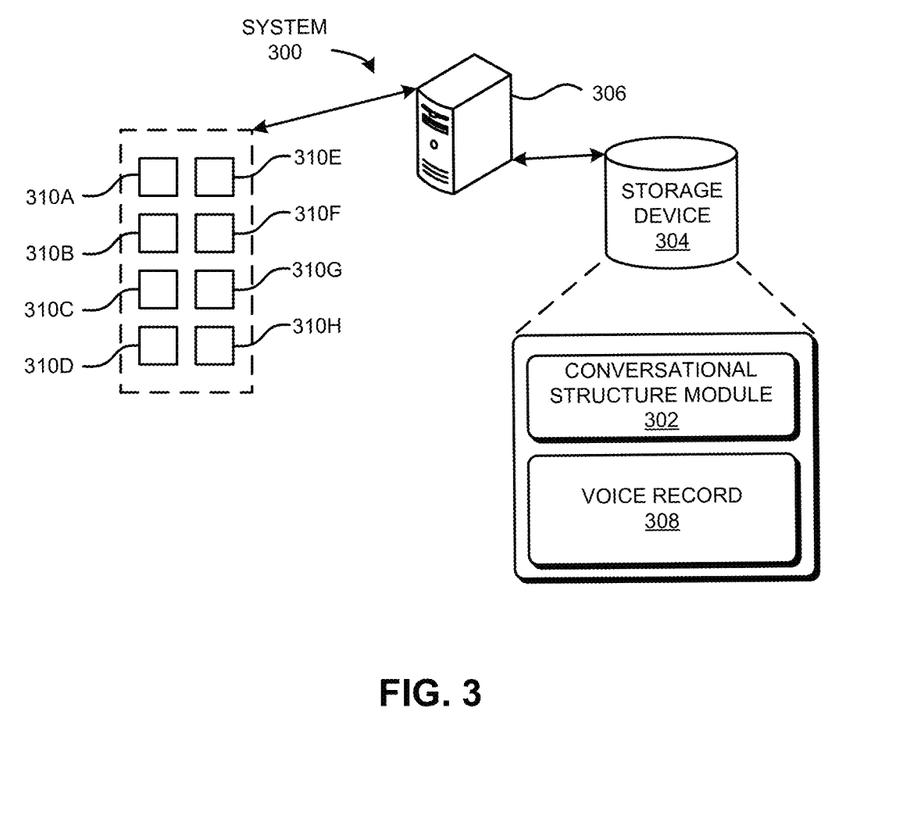
FIG. 3 presents a block diagram illustrating an exemplary architecture of a conversational structure system utilizing the conversational structure extraction method, according to embodiments of the present invention.

FIG. 3 presents a block diagram illustrating an exemplary architecture of a conversational structure system utilizing the conversational structure extraction method, according to embodiments of the present invention. A conversational structure system 300 may divide a conversation and extract conversational structure, according to embodiments, in parallel with multiple processors. Using the methods disclosed herein, system 300 enables the user to extract conversational structure on a larger scale and at a finer level of detail than previous systems, and can feed a comprehensive analytics and business intelligence platform.

Conversational structure system 300 may include a conversational structure module 302 installed on a storage device 304 coupled to a server 306. Note that various implementations of the present invention may include any number of computers, servers, and storage devices. In various implementations, conversational structure module 302 may include an ASR module or other components of conversational structure system 300 to perform the techniques described herein. System 300 may receive data describing a conversation, acoustic and/or lexical features, and store such data in storage device 304. System 300 may read the code for conversational structure module 302 and the data for degradation measurements and features 308 from storage device 304. System 300 may divide a conversation, acoustic and/or lexical features, and assign them to processors, such as processors 310A-310H, which operate on the assigned conversation, acoustic and/or lexical features.

Method for Extracting Conversational Structure

Figure 4:
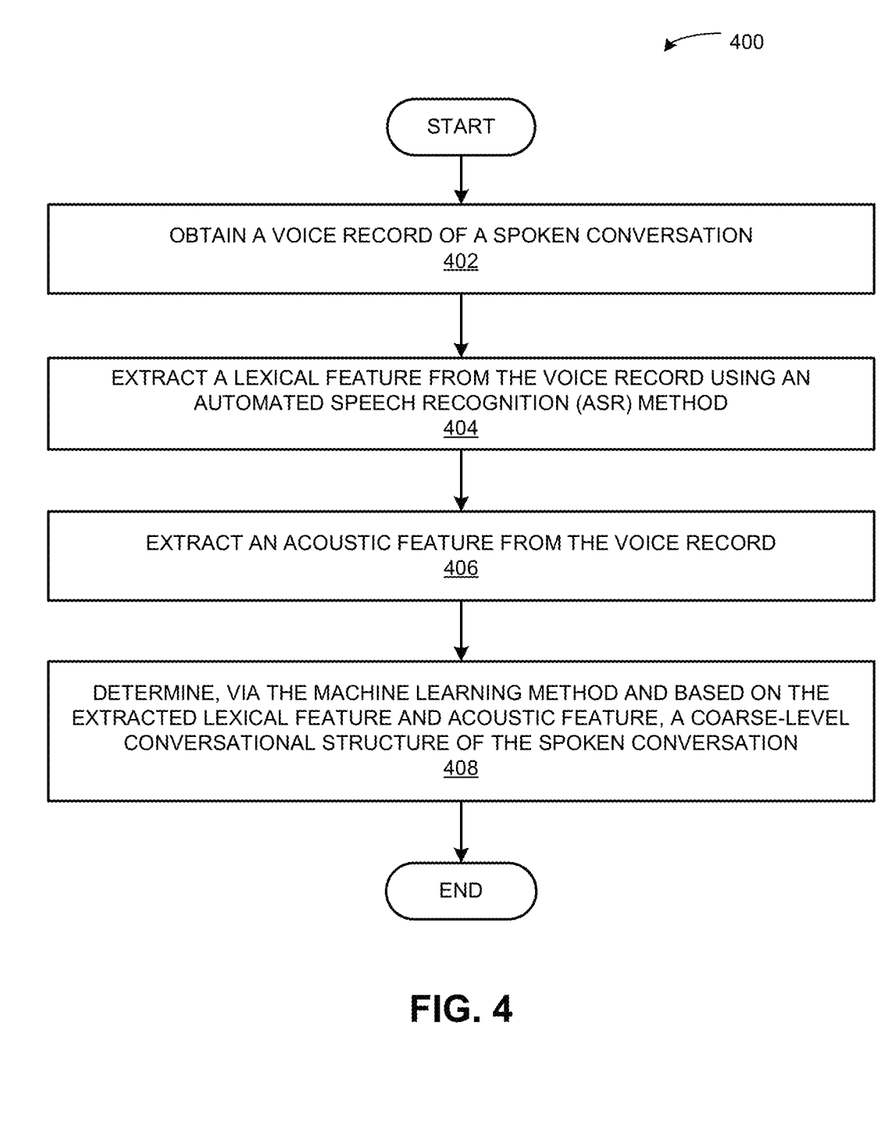
FIG. 4 presents a block diagram illustrating a method for extracting conversational structure based on lexical and acoustic features, according to embodiments of the present invention.

FIG. 4 presents a block diagram illustrating a method for extracting conversational structure based on lexical and acoustic features according to embodiments of the present invention.

During operation, the system obtains a voice record of a spoken conversation (operation 402). This recording may contain single or multiple channels (in the customer service domain, the recording may typically contain two channels—one for each speaker). The system may then extract a lexical feature from the voice record using an automatic speech recognition (ASR) method (operation 404). In some embodiments, extracting the lexical feature from the voice record involves generating a textual transcript of the spoken conversation. In some embodiments, the extracted lexical feature may include a bag of words, turn length, gazetteer, regular expression, or speaker, as described in greater detail below. The system may then extract an acoustic feature from the voice record (operation 406). In some embodiments, the extracted acoustic feature may include speaking pitch, speaking intensity, timing or length of an utterance, timing of silence or pauses, overlap of utterances, repetition of phrases, words, or word fragments, speaking rhythm, speaking rate, speaking intonation, or laughter. The extracted features may also include derived features, e.g. the Mel-frequency cepstral coefficients (MFCC), which may be computed based on measured features. As described above, in some embodiments, the system may analyze or use the lexical and acoustic features in an interdependent way.

The system may then determine, via a machine learning method and based on the extracted lexical feature and acoustic feature, a coarse-level conversational structure of the spoken conversation (operation 408). As described above, in some embodiments, determining the coarse-level conversational structure of the spoken conversation may involve inferring a coarse-level conversational structure from fine-level and/or intermediate-level activities and acoustic features. Note that exemplary coarse- and fine-level activities in the domain of customer service or support phone calls that may be inferred by the system, according to embodiments, are illustrated by Tables 1 and 2 above.

For example, a rising intonation at the end of an utterance may suggest a question. In some embodiments, the system may use this to infer that a customer service agent is engaging in a diagnostic coarse-level activity. Similarly, a change in speaking rate could suggest a topic shift, for example, a speaker might slow down in order to provide information such as a phone number. This, in turn, could suggest a coarse-level activity of personal details gathering, for example a technical support agent asking for personal details like a telephone or account number. As another example, long utterances by a customer compared to short utterances by an agent (e.g., saying "OK") could suggest that the customer is describing a problem or giving other detailed or lengthy information. A pause could suggest that a speaker deliberately pauses, that the conversation goes off on a tangent, or could suggest an uncomfortable silence in the conversation, all of which the system may use to infer different fine-, intermediate-, and/or coarse-level activities.

As described above, the system's analyses of lexical and acoustic elements may be interdependent. Moreover, in some embodiments, the system may not proceed exclusively inductively, i.e. from fine- to coarse-level information, but rather may also use available cues and information in a more interdependent way.

Figure 5:
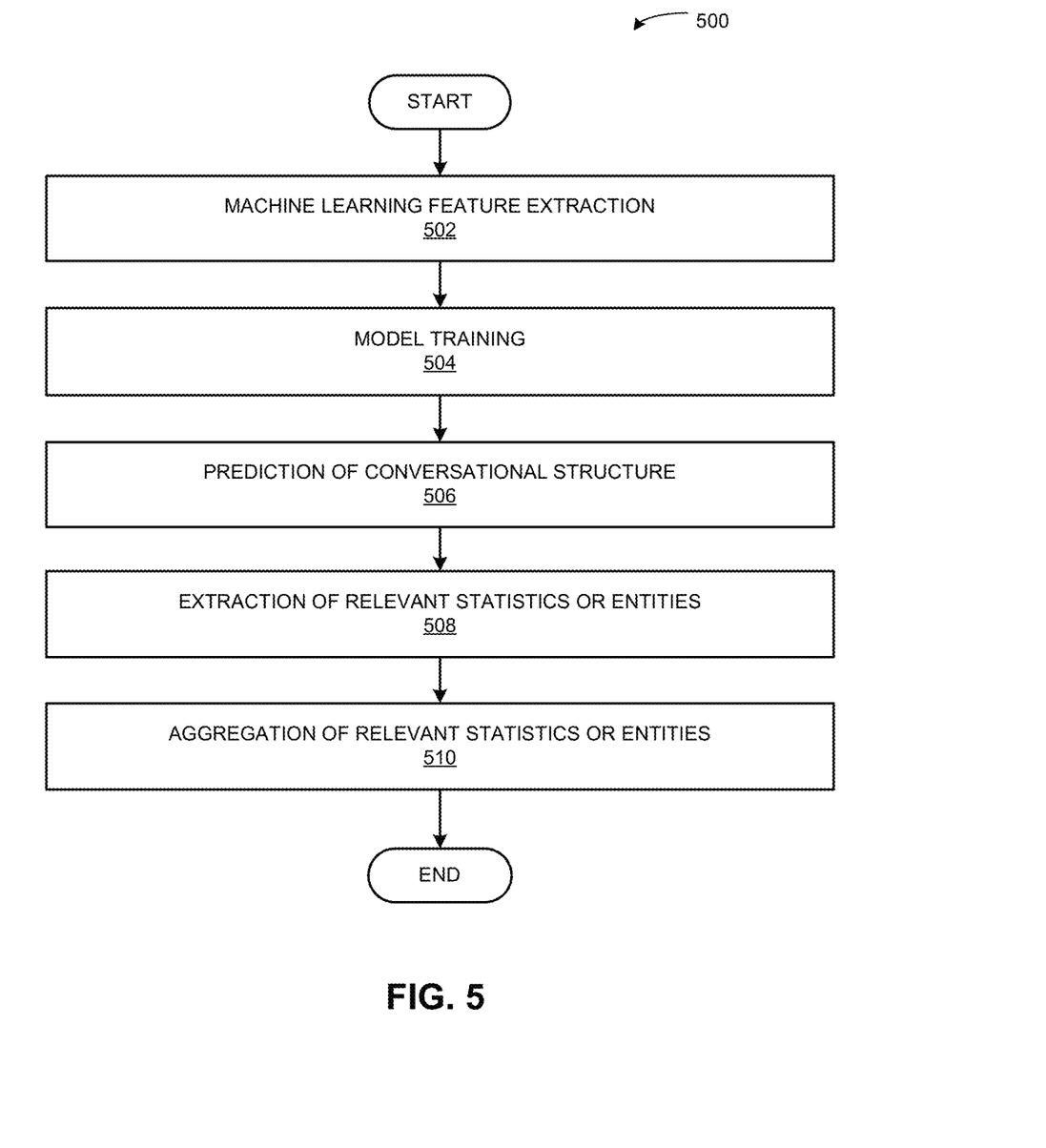
FIG. 5 presents a block diagram illustrating an overall flow for aggregating relevant statistics and entities from spoken conversations, according to embodiments of the present invention.

FIG. 5 presents a block diagram illustrating an overall flow 500 for aggregating relevant statistics and entities from spoken conversations, according to embodiments of the present invention. In some embodiments, method 400 may be incorporated within overall flow 500. An important domain of the disclosed system is customer service phone calls. Making use of the present system, an organization or business could aggregate business- or operations-relevant statistics and entities from the conversational structure. For example, an organization or business could aggregate total or average time spent performing particular activities, reasons for calling, or solutions to problems. Note that these relevant statistics or entities will be described further below.

During operation, the system may first extract features for machine learning (operation 502), as described further below. The system may then train a machine learning model (operation 504), as described further below. The system may then predict conversational structure (operation 506). In some embodiments, method 400 may be incorporated into method 500. Specifically, in some embodiments, method 400 may be incorporated into operations 502, 504, and/or 506. The system may then extract relevant statistics or entities (operation 508), such as total or average time performing activities, reasons for calling, or solutions to problems. The system may then aggregate relevant statistics or entities (operation 510), as described further below. Note that the overall flow described here is exemplary, and need not be limited to the exact steps or order listed here.

Machine Learning Models and Feature Extraction

Embodiments of the present invention may implement a machine learning or statistical model for predicting activities. In some embodiments, the machine learning method may include a sequence model. In some embodiments, the system may track, via the sequence model, a global conversational state representing a coarse-level activity within the conversational structure.

In these models, each conversation may be represented as a sequence of observations $x=\{x_t\}^T_1$, where $x_t$ denotes a feature vector at turn t of the conversation, and t may take values from 1 to T. Likewise, $y=\{y_t\}^T_1$ may denote the corresponding turn-level activity labels. In some embodiments, discriminative models may be favored over generative models since discriminative models can accommodate a large number of (likely correlated) features. In some embodiments, the model may be a logistic regression classifier, a linear-chain conditional random field, a hidden Markov model (HMM) with logistic regression, or an HMM with logistic regression and a global state.

Logistic Regression: A logistic regression classifier may predict the label for each turn independently, ignoring the sequential structure of the dialogue. In some embodiments, the system may use a library such as the scikit-learn one-vs-all Python library implementation of regularized logistic regression.

Linear-Chain CRF: Linear-chain conditional random fields have become a standard discriminative model for sequence labeling. In some embodiments, the linear-chain CRF model may be implemented using a library such as the CRFsuite library.

HMM with Logistic Regression: Hidden Markov models are the generative analog of the linear-chain CRF. In some embodiments, the system may implement a fully supervised HMM with activities as hidden states, where the joint probability of x and y may be defined as: $p(x,y)=\Pi_{t=1}^T p(y_t|y_{t-1})p(x_t|y_t)$. In some embodiments, the system may incorporate a discriminative classifier into the HMM by expressing the emission probability $p(x_t|y_t)$ as a function of $p(y_t|x_t)$ according to Bayes' rule: $p(x_t|y_t)=p(x_t) p(y_t|x_t)/p(y_t)$. Because $x_t$ is fixed, $p(x_t)$ may be ignored. In some embodiments, the system may use a logistic regression model, as described above, to compute $p(y_t|x_t)$.

HMM with Logistic Regression and Global State: A limitation of HMM models is that they have no memory, i.e. future states depend only on the current state (or more formally, future states are conditionally independent of past states given the current state). For predicting activities, this may be a limiting assumption because the state only encodes the current activity. The broader context of the dialogue may be lost, and this broader context may be important for estimating transition probabilities. In some embodiments, the system may capture this broader context by introducing a global state variable $g=\{g_t\}^T_1$, where $g_t$ denotes the global state at turn t. In some embodiments, the system may use these global states to condition the transition probabilities in an HMM, according to: $p(x,y)=\Pi_{t=1}^T p(y_t|y_{t-1}, g_{t-1})p(x_t|y_t)$.

For example, if the current activity is Personal Details, it may be useful for the system to know whether this is part of the initial caller identification or in the middle of the fix deployment. In the former case, it is likely that Problem Description will soon follow. In the latter case, Fix Deployment is more likely.

Figure 6:
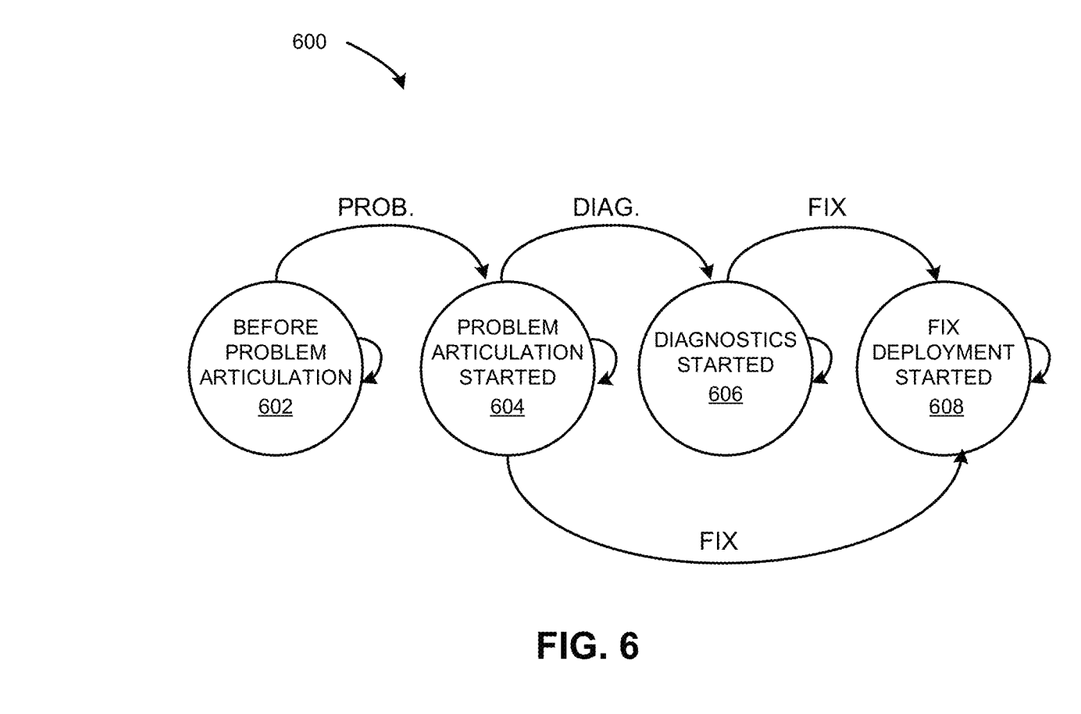
FIG. 6 illustrates a state transition diagram for exemplary global states triggered by activities, according to embodiments of the present invention.

FIG. 6 illustrates a state transition diagram for global states triggered by activities, according to embodiments of the present invention. For example, as shown in FIG. 6, the system may consider transitions for global states $g_t$ such as: BP (Before Problem Articulation) 602, PS (Problem Articulation Started) 604, DS (Diagnostics Started) 606, FS (Fix Deployment Started) 608. The activities $y_t$=Problem Articulation, Diagnostics, and Fix Deployment may trigger global state transitions. As shown in FIG. 6, the system may compute a global state $g_t$ as a function of the previous global state $g_{t-1}$ and the current activity $y_t$: $g_t=f(g_{t-1}; y_t)$. For example, f(BP; Problem Articulation)=PS. Activities not shown in the figure may trigger self-transitions in the global states.

During training, the system may compute the global states $g_t$ directly in a recursive fashion since y is known. In some embodiments, the system computes the transition probabilities $p(y_t|y_{t-1}, g_{t-1})$ by learning a separate transition model for each global state. In the inference phase, the system may decode the joint states $(y_t; g_t)$ using a simple variant of the Viterbi algorithm. One additional step is needed to assign $g_t$ based on $g_{t-1}$ and $y_t$.

Features

In some embodiments, sets of features may be constructed from the ASR output for each turn, including a bag of words, n-grams, prefixes, suffixes, turn length, gazetteers, regular expressions, grammatical/syntactic structures, and speaker.

Bag of words: These features may represent the word counts within each turn.

Turn length: The turn-length features may measure the number of characters in the ASR output for a given turn. In some embodiments, the system may convert this to a set of binary features by binning the length.

Gazetteers: These features may indicate whether any of the words in the turn matched one of three gazetteers: a first name gazetteer, a phone brand gazetteer, and a phone model gazetteer. In some embodiments, the system may base the names gazetteer on a list of first names from a library such as the Natural Language Toolkit Python library, but with ambiguous names, e.g. Joy, removed. In some embodiments, the phone model and brand gazetteers may be constructed by hand.

Regular expressions: In some embodiments, several regular expressions may be manually constructed to identify phenomena that would be useful for predicting activities. For example, a regular expression may be used to identify various forms of "how can I help you," or to identify sequences of numbers. Then the regular expression features may indicate whether ASR output for an utterance matches each expression.

Grammatical/syntactic features: These features may include parts of speech or other grammatical features of spoken words, parse trees, phrase marker, syntactic parse, grammeme, lexeme, word order, semantic networks, etc.

Speaker: In the domain of customer service, each turn in the dialog is spoken by a customer or an agent. Because the customer and agent may play very different roles in the dialogue, it is important to consider the relationship between the speaker and the other features described above. For example, a long customer turn may indicate that the customer is providing information, which suggests Problem Articulation as the activity. A long turn by the agent, on the other hand, may suggest that the agent is providing information as part of Fix Deployment. In some embodiments, the system may incorporate the speaker into the final feature set in various ways. First, the system may include binary features indicating whether the customer is speaking or the agent is speaking. Second, the system may use conjunctive features that take the product of these speaker indicators with all of the other features described above. Such conjunctive features may be useful for capturing the interaction between the speaker binary feature and other features, e.g. a long turn.

Business Intelligence Platform and Applications

An important domain of the disclosed system is customer service phone calls. The automated approaches to determining conversational structure disclosed herein enable the extraction of call structure on a much larger scale and finer level of detail than manual approaches or previous systems.

Many organizations and businesses, particularly those engaging in customer service phone calls, have a need to aggregate relevant statistics and entities from a collection of spoken conversations. For example, an organization may wish to know the total or average time spent performing activities such as coarse-grain conversational activities. It may also wish to understand or analyze various relevant entities, such as reasons for calling (e.g., can't connect to the internet) or solutions to the problems (e.g., enable wi-fi). Making use of the present system, the organization or business could aggregate such relevant statistics and entities from the conversational structure. For example, the extracted structure of conversations or calls would provide time spent in conversational activities directly. For the other aforementioned entities, the structure of the call identifies conversational activities where those entities are likely to occur. For example, reason for calling would likely be found in a Problem Articulation conversational activity section.

In some embodiments, the extracted call structure can feed a comprehensive analytics and business intelligence platform. This platform may use a call structure extracted by the methods and systems disclosed herein to compute aggregate statistics such as total time spent in the various fine- and coarse-level activities, such as those listed in Tables 1 and 2, or other entities such as the ones mentioned above. These aggregate statistics may be taken over a plurality of conversations. The aggregate statistics may also include a distribution, such as a percentage of time spent in these various activities or global conversational states. The aggregate statistics may also include a distribution over time, or a change in the distribution over time.

The platform may also support 'drilling down,' to allow a user to study the conversational structure and details of individual calls. The conversational structure extracted by the disclosed system may further enable or facilitate automated extraction of targeted information such as specific entities from a conversation or conversations. For example, in some embodiments, the system may extract the customer's problem, or reason for the call, based on the portion of the conversation corresponding to the Problem Articulation section. In some embodiments, the system and business intelligence platform may extract sub-categories. For example, a sub-category of Problem Articulation may be a type or sub-type of problem.

Exemplary Apparatus

Figure 7:
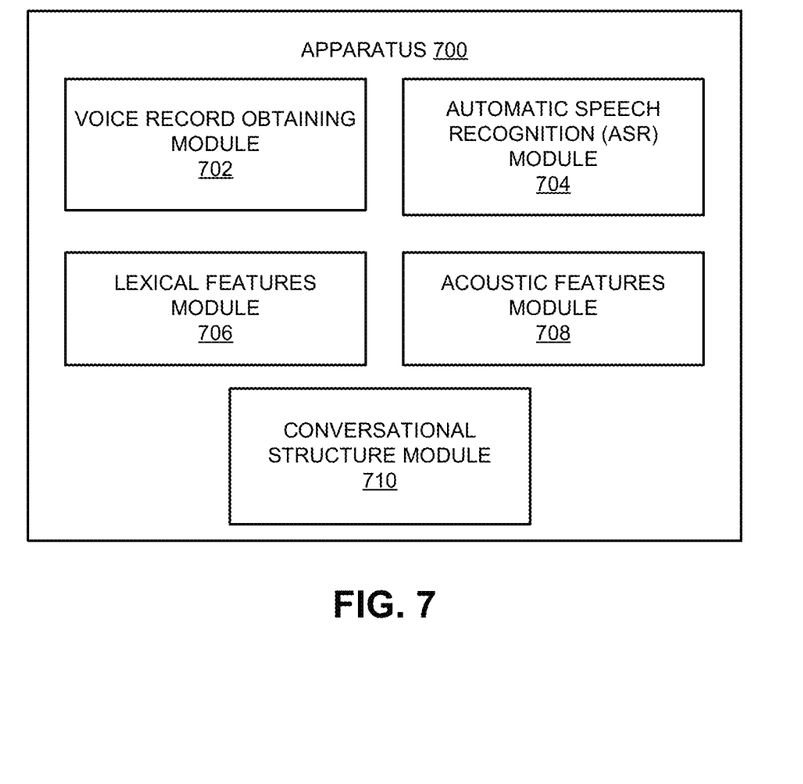
FIG. 7 presents a block diagram illustrating an exemplary apparatus for extracting conversational structure, in accordance with embodiments of the present invention.

FIG. 7 presents a block diagram illustrating an exemplary apparatus for extracting conversational structure, in accordance with embodiments of the present invention. Apparatus 700 can comprise a plurality of modules which may communicate with one another via a wired or wireless communication channel. Apparatus 700 may be realized using one or more integrated circuits, and may include fewer or more modules than those shown in FIG. 7. Further, apparatus 700 may be integrated in a computer system, or realized as a separate device which is capable of communicating with other computer systems and/or devices. Specifically, apparatus 700 can comprise a voice record obtaining module 702, an automatic speech recognition (ASR) module 704, a lexical features module 706, an acoustic features module 708, and a conversational structure module 710. Note that apparatus 700 may also include additional modules not depicted in FIG. 7.

In some embodiments, voice record obtaining module 702 can obtain a voice record of a spoken conversation. Automatic speech recognition (ASR) module 704 may apply ASR and/or machine learning to generate a textual transcript of the spoken conversation. Lexical features module 706 may extract a lexical feature from the voice record using an automatic speech recognition (ASR) method. Acoustic features module 708 may extract an acoustic feature from the voice record. Conversational structure module 710 may determine a coarse-level structure of the conversation via a machine learning method and based on the extracted lexical feature and acoustic feature. Note that conversational structure module 302 illustrated in FIG. 3 may provide any and all functions of the various modules depicted in FIG. 7.

Exemplary System

Figure 8:
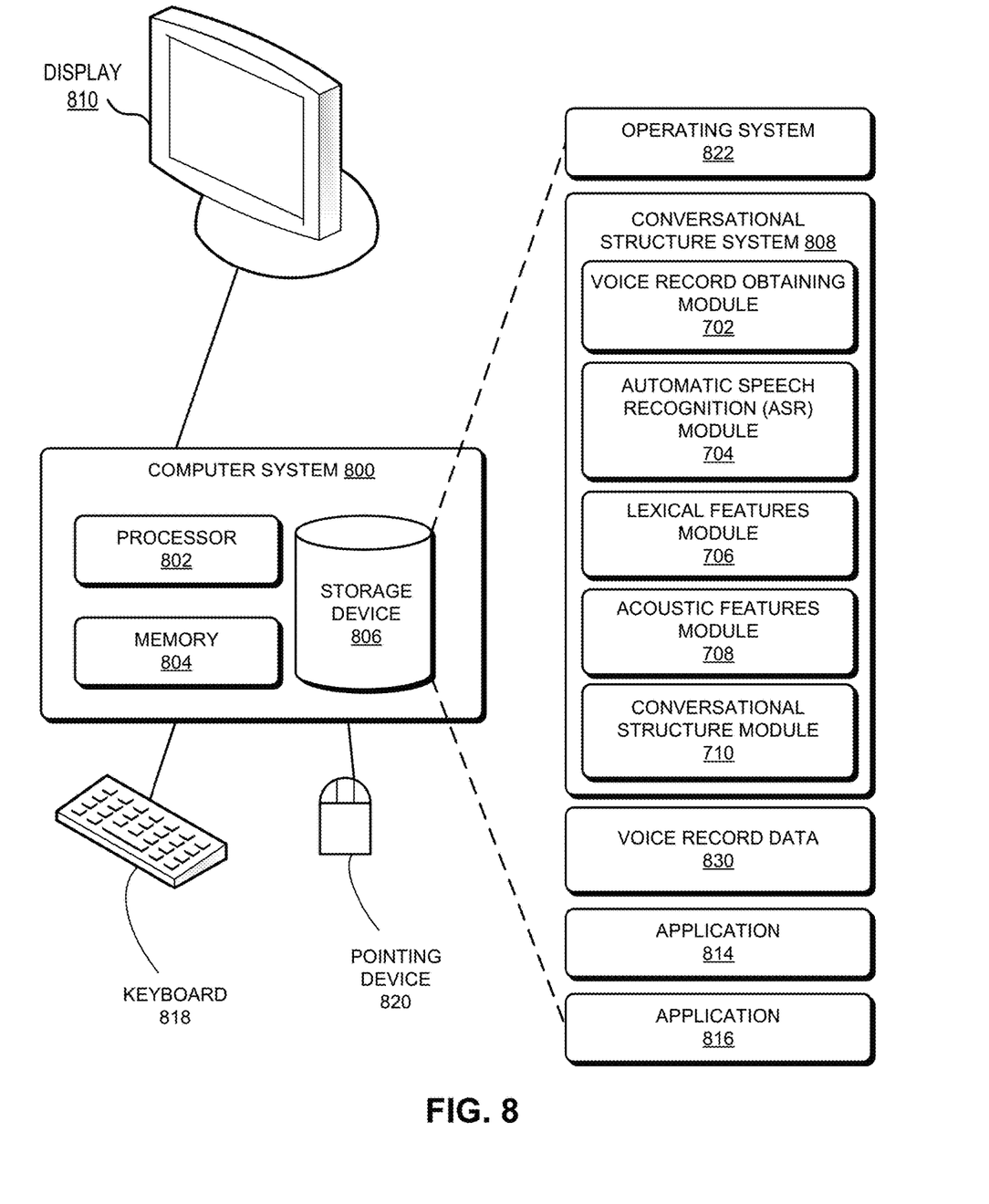
FIG. 8 presents a block diagram illustrating an exemplary computer system for extracting conversational structure, in accordance with embodiments of the present invention.

FIG. 8 presents a block diagram illustrating an exemplary computer system for extracting conversational structure, in accordance with embodiments of the present invention. In some embodiments, computer system 800 may be a server. In some embodiments, system 800 includes a processor 802, a memory 804, and a storage device 806. In some embodiments, 802 may include a set of processors. Storage device 806 may store a number of applications, such as applications 814 and 816, which may make use of enhanced conversational structure determination according to embodiments of the present invention, and operating system 822. Storage device 806 also stores conversational system 808 that may include a voice record obtaining module 702, an automatic speech recognition (ASR) module 704, a lexical features module 706, an acoustic features module 708, and a conversational structure module 710. System 800 and/or voice record obtaining module 702 may receive or generate voice record data 830 comprising a voice record of a spoken conversation and may copy voice record data to a memory section accessible to conversational system 808. During operation, one or more applications, such as conversational system 808, are loaded from storage device 806 into memory 804 and then executed by processor set 802. While executing the program, processor set 802 performs the aforementioned functions. System 800 may be coupled to a display 810, a keyboard 818, and a pointing device 820.

Voice record obtaining module 702 can obtain a voice record of a spoken conversation. Automatic speech recognition (ASR) module 704 may apply ASR and/or machine learning to generate a textual transcript of the spoken conversation. Lexical features module 706 may extract a lexical feature from the voice record using an automatic speech recognition (ASR) method. Acoustic features module 708 may extract an acoustic feature from the voice record. Conversational structure module 710 may determine a coarse-level structure of the conversation via a machine learning method and based on the extracted lexical feature and acoustic feature. Note that conversational structure module 302 illustrated in FIG. 3 may provide any and all functions of the various modules depicted in FIG. 8.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for extracting conversational structure from a spoken conversation, comprising:
    obtaining, by a computer system comprising a set of processors, a voice record of the spoken conversation;
    dividing the voice record into at least three sequential utterances spoken by two different speakers;
    extracting a lexical feature from a respective utterance of the three sequential utterances in the voice record using an automatic speech recognition;
    extracting an acoustic feature from a respective utterance of the three sequential utterances in the voice record; and
    determining, via a machine learning method and based on the extracted lexical and acoustic features, a coarse-level conversational structure of the spoken conversation, which involves:
        determining a plurality of fine-level conversational activities based on the three sequential utterances, wherein a respective fine-level conversational activity is an activity identified based on respective words spoken by the two different speakers;
        determining, based on the plurality of fine-level conversational activities, a plurality of coarse-level conversational activities, wherein a respective coarse-level conversational activity of the plurality of coarse-level conversational activities indicates a phase of the spoken conversation that includes multiple fine-level conversational activities of the plurality of fine-level conversational activities; and
        generating the coarse-level conversational structure from the plurality of coarse-level conversational activities, wherein the coarse-level conversational structure indicates a high-level structure of the spoken conversation spanning the three sequential utterances.

2. The method of claim 1:
    wherein extracting the lexical feature further comprises generating a textual transcript of the voice record of the spoken conversation;
    wherein extracting the acoustic feature further comprises identifying, based on the extracted acoustic feature and the textual transcript, three fine-level conversational activities associated respectively with the three sequential utterances; and
    wherein determining the coarse-level conversational structure further comprises:
        identifying that a first and a second fine-level conversational activities of the three fine-level conversational activities correspond to a first coarse-level conversational activity; and
        identifying that a third fine-level activity of the three fine-level conversational activities transitions to a second coarse-level activity, which is different from the first coarse-level conversational activity.

3. The method of claim 1, wherein the spoken conversation is a customer service conversation, and wherein the plurality of coarse-level conversational activities include one or more of:
    opening;
    detail gathering;
    equipment identification;
    security questions;
    problem articulation;
    diagnostics;
    fix deployment;
    customer satisfaction questions;
    hold;
    transfer;
    pre-closing; and
    closing.

4. The method of claim 1, wherein the extracted acoustic feature includes one or more of:
    speaking pitch;
    speaking intensity;
    timing or length of an utterance;
    timing of silence or pauses;
    overlap of utterances;
    repetition of phrases, words, or word fragments;
    speaking rhythm;
    speaking rate;
    speaking intonation;
    laughter;
    a Mel-frequency cepstral coefficient (MFCC); and
    a derived acoustic feature.

5. The method of claim 1, further comprising determining, via the machine learning method and based on the extracted lexical feature and acoustic feature, a fine-level activity structure of the spoken conversation, wherein the fine-level activity structure indicates a structure of one of the three sequential utterances.

6. The method of claim 5, further comprising determining, via the machine learning method and based on the extracted lexical feature and acoustic feature, one or more intermediate-level structures of the spoken conversation.

7. The method of claim 5, wherein the fine-level activity structure indicates a fine-level activity including one or more of:
    an information request;
    a clarification request;
    a repetition request;
    an action request;
    pointing;
    a future action request;
    an alignment request;
    a continuer;
    a confirmation;
    a sequence closer;
    a correction;
    information provision;
    reporting activity status;
    waiting;

reporting a future event; and
reciprocity.

8. The method of claim 1:
wherein the machine learning method comprises a sequence model; and
wherein determining the coarse-level conversational structure further comprises tracking, using the sequence model, a global conversational state within the coarse-level conversational structure.

9. The method of claim 1, further comprising:
computing for a user, via a business intelligence platform, an aggregate statistic, comprising a distribution over activities, categories, and/or entities, from a plurality of conversations that includes the spoken conversation; and
extracting for the user, via the business intelligence platform, targeted information about the spoken conversation.

10. A non-transitory computer-readable storage medium storing instructions that when executed by a computer cause the computer to perform a method for extracting conversational structure from a spoken conversation, the method comprising:
obtaining a voice record of the spoken conversation;
dividing the voice record into at least three sequential utterances spoken by two different speakers;
extracting a lexical feature from a respective utterance of the at least three sequential utterances in the voice record using speech recognition;
extracting an acoustic feature from a respective utterance of the at least three sequential utterances in the voice record; and
determining, via a machine learning method and based on the extracted lexical and acoustic features, a coarse-level conversational structure of the spoken conversation, which involves:
 determining a plurality of fine-level conversational activities based on the three sequential utterances, wherein a respective fine-level conversational activity is an activity identified based on respective words spoken by the two different speakers;
 determining, based on the plurality of fine-level conversational activities, a plurality of coarse-level conversational activities, wherein a respective coarse-level conversational activity of the plurality of coarse-level conversational activities indicates a phase of the spoken conversation that includes multiple fine-level conversational activities of the plurality of fine-level conversational activities; and
 generating the coarse-level conversational structure from the plurality of coarse-level conversational activities, wherein the coarse-level conversational structure indicates a high-level structure of the spoken conversation spanning the at least three sequential utterances.

11. The non-transitory computer-readable storage medium of claim 10:
wherein extracting the lexical feature further comprises generating a textual transcript of the voice record of the spoken conversation;
wherein extracting the acoustic feature further comprises identifying, based on the extracted acoustic feature and the textual transcript, three fine-level conversational activities associated respectively with the three sequential utterances; and
wherein determining the coarse-level conversational structure further comprises:
 identifying that a first and a second fine-level conversational activities of the three fine-level conversational activities correspond to a first coarse-level conversational activity; and
 identifying that a third fine-level activity of the three fine-level conversational activities transitions to a second coarse-level activity, which is different from the first coarse-level conversational activity.

12. The non-transitory computer-readable storage medium of claim 10, wherein the extracted acoustic feature includes one or more of:
speaking pitch;
speaking intensity;
timing or length of an utterance;
timing of silence or pauses;
overlap of utterances;
repetition of phrases, words, or word fragments;
speaking rhythm;
speaking rate;
speaking intonation;
laughter;
a Mel-frequency cepstral coefficient (MFCC); and
a derived acoustic feature.

13. The non-transitory computer-readable storage medium of claim 10, wherein the method further comprises determining, via the machine learning method and based on the extracted lexical feature and acoustic feature, a fine-level activity structure of the spoken conversation, wherein the fine-level activity structure indicates a structure of one of the three sequential utterances.

14. The non-transitory computer-readable storage medium of claim 13, wherein the method further comprises determining, via the machine learning method and based on the extracted lexical feature and acoustic feature, one or more intermediate-level structures of the spoken conversation.

15. The non-transitory computer-readable storage medium of claim 10:
wherein the machine learning method comprises a sequence model; and
wherein determining the coarse-level conversational structure further comprises tracking, using the sequence model, a global conversational state within the coarse-level conversational structure.

16. A computing system for extracting conversational structure from a spoken conversation, the system comprising:
a set of processors; and
a non-transitory computer-readable medium coupled to the set of processors storing instructions thereon that, when executed by the processors, cause the processors to perform a method for extracting conversational structure from a spoken conversation, the method comprising:
obtaining a voice record of the spoken conversation;
dividing the voice record into at least three sequential utterances spoken by two different speakers;
extracting a lexical feature from a respective utterance of the three sequential utterances in the voice record using an automatic speech recognition;
extracting an acoustic feature from a respective utterance of the three sequential utterances the voice record; and
determining, via a machine learning method and based on the extracted lexical feature and acoustic feature, a coarse-level conversational structure of the spoken conversation, which involves:

determining a plurality of fine-level conversational activities based on the three sequential utterances, wherein a respective fine-level conversational activity is an activity identified based on respective words spoken by the two different speakers;

determining, based on the plurality of fine-level conversational activities, a plurality of coarse-level conversational activities, wherein a respective coarse-level conversational activity of the plurality of coarse-level conversational activities indicates a phase of the spoken conversation that includes multiple fine-level conversational activities of the plurality of fine-level conversational activities; and generating the coarse-level conversational structure from the plurality of coarse-level conversational activities, wherein the coarse-level conversational structure indicates a high-level structure of the spoken conversation spanning the three sequential utterances.

17. The computing system of claim 16:

wherein extracting the lexical feature from the voice record further comprises generating a textual transcript of the voice record of the spoken conversation;

wherein extracting the acoustic feature from the voice record further comprises identifying, based on the extracted acoustic feature and the textual transcript, three fine-level conversational activities associated respectively with the three sequential utterances; and wherein determining the coarse-level conversational structure of the spoken conversation further comprises:

identifying that a first and a second fine-level conversational activities of the three fine-level conversational activities correspond to a first coarse-level conversational activity; and identifying that a third fine-level activity of the three fine-level conversational activities transitions to a second coarse-level activity, which is different from the first coarse-level conversational activity.

18. The computing system of claim 16, wherein the extracted acoustic feature includes one or more of:

speaking pitch;
speaking intensity;
timing or length of an utterance;
timing of silence or pauses;
overlap of utterances;
repetition of phrases, words, or word fragments;
speaking rhythm;
speaking rate;
speaking intonation; and
laughter;
a Mel-frequency cepstral coefficient (MFCC); and
a derived acoustic feature.

19. The computing system of claim 16, wherein the method further comprises determining, via the machine learning method and based on the extracted lexical feature and acoustic feature, a fine-level activity structure of the spoken conversation, wherein the fine-level activity structure indicates a structure of one of the three sequential utterances.

20. The computing system of claim 16:

wherein the machine learning method comprises a sequence model; and wherein determining the coarse-level conversational structure further comprises tracking, using the sequence model, a global conversational state within the coarse-level conversational structure.

* * * * *